Figure 1:
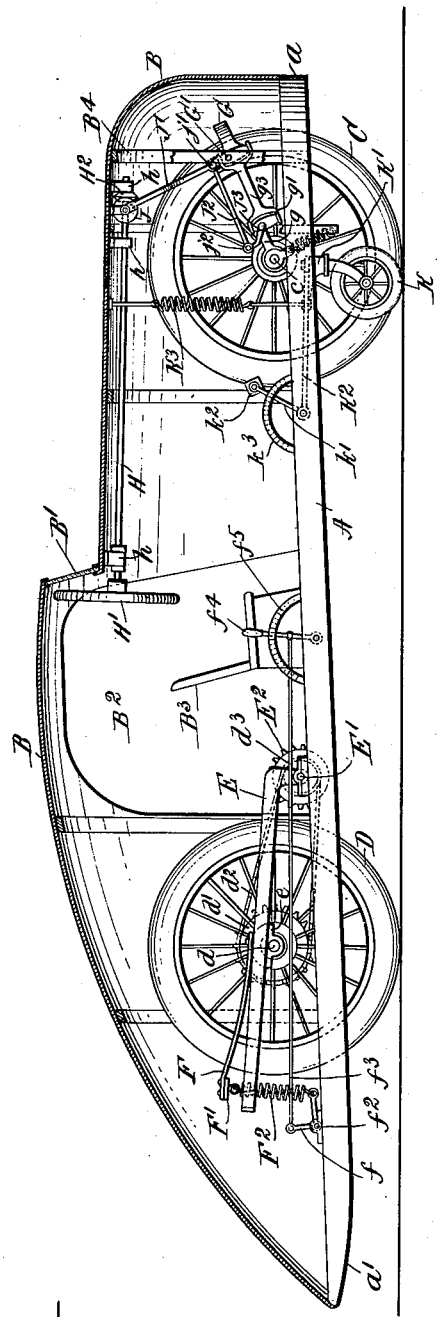

P. W. WHITE.
MOTOR VEHICLE.
APPLICATION FILED NOV. 23, 1912.

1,183,938.

Patented May 23, 1916.
3 SHEETS—SHEET 1.

WITNESSES:
M. E. Flaherty.
A. E. O'Brien.

INVENTOR:
Percival W. White,
By his attorneys.

UNITED STATES PATENT OFFICE.

PERCIVAL W. WHITE, OF BRUNSWICK, MAINE.

MOTOR-VEHICLE.

1,183,938.  Specification of Letters Patent.  Patented May 23, 1916.

Application filed November 23, 1912. Serial No. 733,073.

*To all whom it may concern:*

Be it known that I, PERCIVAL W. WHITE, of Brunswick, in the county of Cumberland and State of Maine, a citizen of the United States, have invented a new and useful Improvement in Motor-Vehicles, of which the following is a specification.

One purpose of my invention is to combine in the one machine the desirable features of the automobile with the desirable features of the motor cycle, at the same time eliminating many of the faults of both vehicles. I thus provide a machine which has the lightness, easy control, simplicity, and general handiness of the motor cycle, without the rigidity, vibration, faulty fork construction, and tendencies to skid, and general discomfort and danger of that means of locomotion. On the other hand, there is incorporated in my machine the comfort, springiness, large wheels, long wheel-base, and closed-in effect of the automobile, without the automobile's intricate spring system, differential gear, mud guards, and other appurtenances which stand in the way of its being developed into a vehicle presenting the least possible resistance to the air. In fact, the action of my machine with respect to the air is precisely the same as that of a monoplane, being, for purposes of illustration, merely a monoplane without wings. Thus, the under surface of its body acts as an aeroplane or lifting surface, which tends to lift the machine somewhat into the air, taking the weight off the wheels and reducing road shocks.

For military purposes the inclosed structure of the vehicle permits its being armored with steel at every point except where the wheels touch the ground, a thing not possible with any other form of vehicle except at the expense of great weight and clumsiness.

Other advantages of my machine arise from its having an unusually low center of gravity, due to the underslung construction, making it easy riding, easier to control, and safer at high speeds.

In the drawings I have shown an embodiment of my machine in the best form now known to me.

Figure 2:
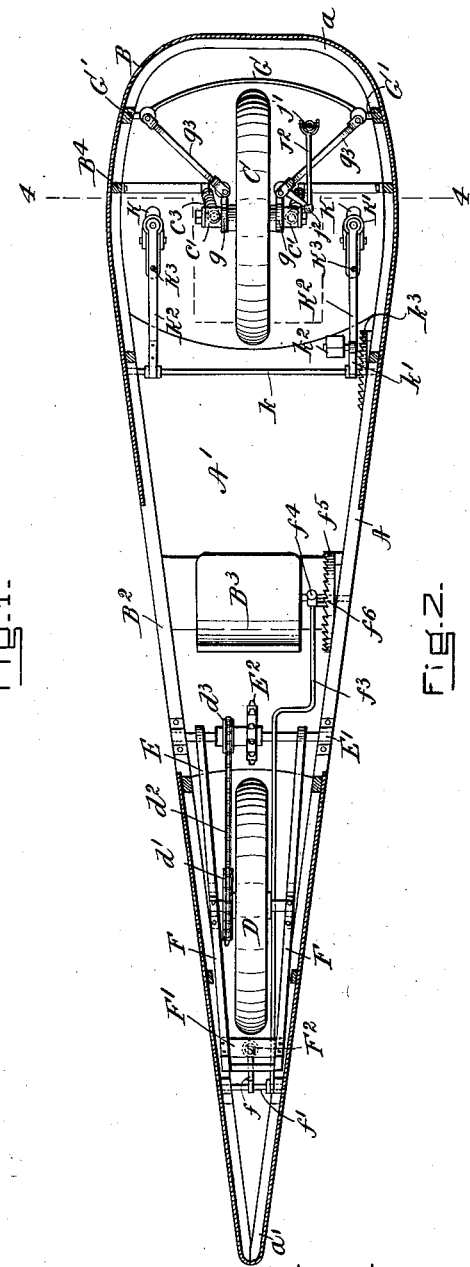
Figure 3:
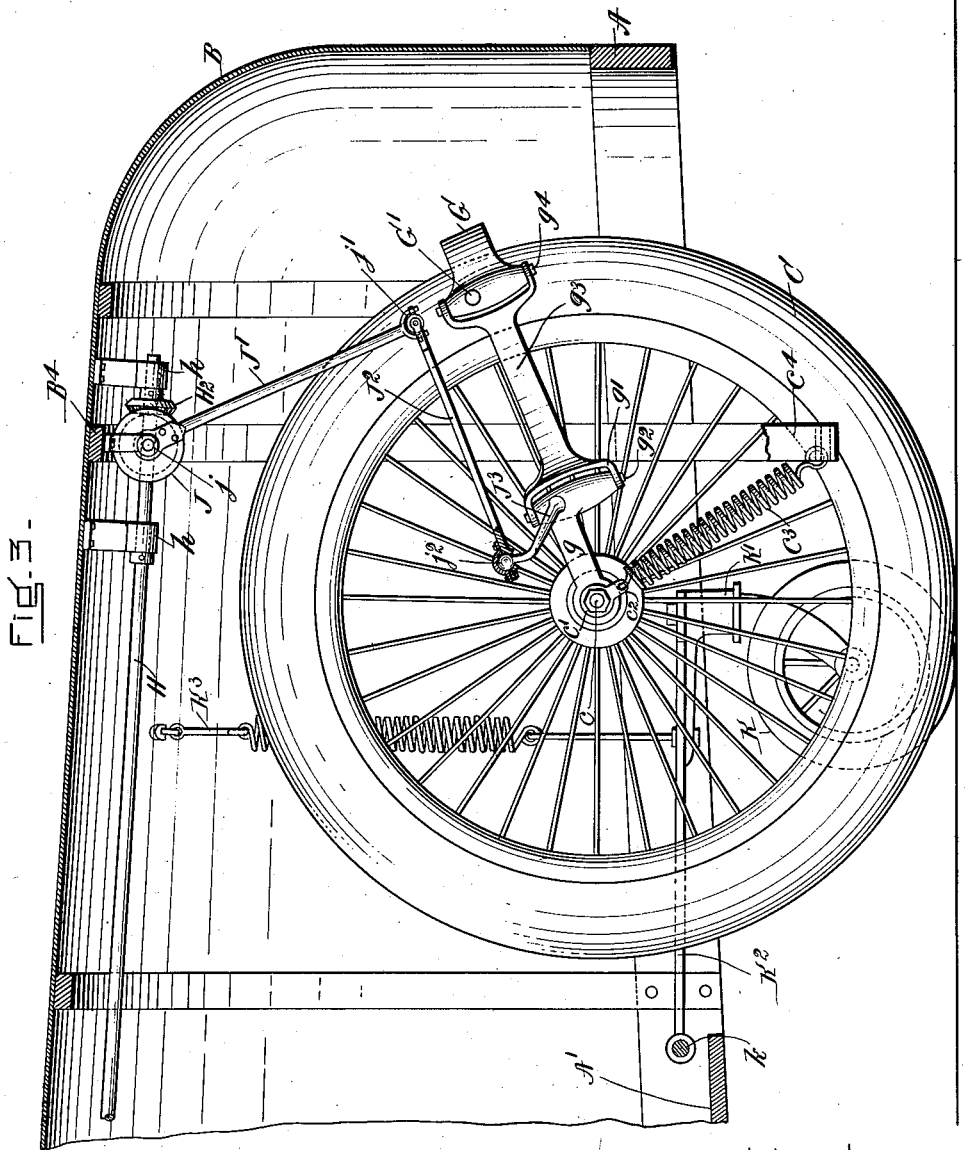
Figure 4:
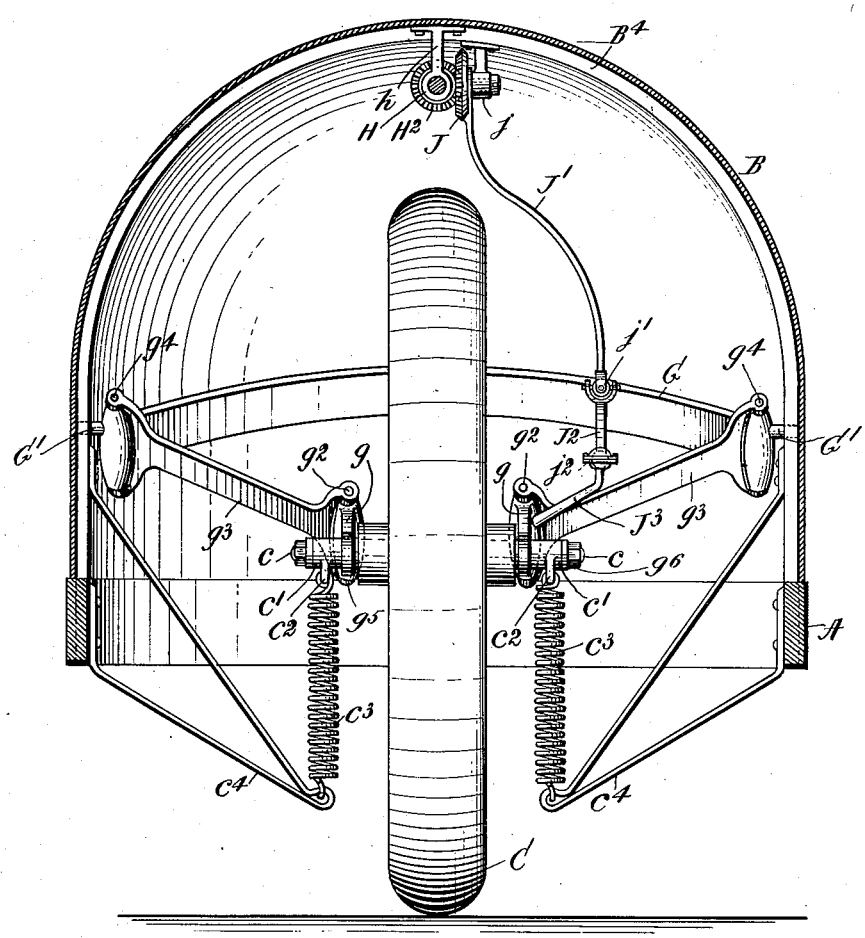

Figure 1 is a side view of the machine, the housing being in section. Fig. 2 is a plan of the interior of the machine, the housing and steering arm being in section. Fig. 3 is an enlarged vertical section of the front of the machine, showing the steering mechanism in elevation. Fig. 4 is a cross section taken on line 4—4 of Fig. 2.

A is the sill or main frame of the machine carrying the flooring and preferably shaped as shown, *i. e.*, rounded at the front as shown at $a$ and tapering at the rear as at $a^1$.

$A^1$ is the flooring which extends from a point in rear of the front wheel to a point in front of the rear wheel, the front edge being shaped to allow the front or guiding wheel to be turned freely in steering as occasion may require.

Mounted on the sill A is a housing B preferably made of sheet metal and shaped at its lower edge to fasten to the sill and forming an inclosure for the mechanism, offering by its shape the least resistance to the air. The rear portion is somewhat higher than the front to provide head-room for the passengers as well as an opening through which the driver may look forward, which opening may be closed by a glass windshield $B^1$. This housing incloses the wheels, engine, and passengers, partly for protection and partly to secure the streamline form of the vehicle. The housing has an opening $B^2$ at each side which may be closed by curtains or doors, and within is a seat $B^3$ for the driver. The engine (not shown) may be located in front of the driver and other seats may be provided in the rear if desired. These details form no part of my invention.

An important feature of my invention is the way by which the sill and those parts which it carries are suspended from the axles, and also the means for steering by the front wheel. C is the front wheel. D is the rear wheel or trailer. The wheel D is mounted on an axle $d$ upon which it runs preferably on ball or roller bearings, the ends of the axle being supported in straps $e$ attached to the radius frame E. This frame is preferably trapezoidal in plan and its front or longer base is preferably mounted on the power shaft $E^1$ to swing thereon. The rear end of the frame E is also attached to the sill A by a spring connection so that the wheel and body may have a yielding movement with relation to each other to allow for irregularities in the roadbed. The spring connection which I prefer comprises a pair of springs F one located on each side of the radius frame E and each connected at its front end thereto. The rear end of each spring is connected to a crossbar $F^1$ which in turn is connected by a spiral spring $F^2$ with the sill A. In the form of my invention shown in the drawings the spring $F^2$ is connected to the sill A by means of a bell crank lever $f$ mounted on a cross-shaft $f^1$ which swings in bearings $f^2$ on the sill A. As shown, one end of the spring $F^2$ is connected to the horizontal arm of the lever $f$ while the other arm of the bell crank lever is connected by the connecting rod $f^3$ with the handle $f^4$ pivoted to one side of the sill and having a projection $f^6$ adapted to engage the rack $f^5$, also mounted on the side of the sill. By this means the relation of the rear end of the sill and the axle $d$ may be adjusted as and for the purposes described below. The wheel D carries a sprocket $d^1$ by which power is applied to it by a chain $d^2$ running over the sprocket $d^3$ on the shaft $E^1$. The shaft $E^1$ carries a second sprocket $E^2$ which is connected by a chain with the engine shaft. Any other convenient form of connection may be used. This method of suspending the body from the rear axle aside from having the advantage of keeping the wheel always in proper alinement, has the further advantage that the rear sprocket $d^1$ is kept at a constant distance from the driving sprocket $d^3$ and the driving chain $d^2$ is always under the same amount of tension.

The suspension of the body from the front wheel is somewhat similar to that from the rear except that in the former case the position of the wheel may be shifted for the purpose of controlling the machine. At each end of the front axle $c$ there is a sleeve $c^1$ carrying an eye $c^2$ to which is connected one end of a spiral spring $c^3$. The other end of each spiral spring is connected to a spring bracket $c^4$ projecting downward from the inner wall of the housing B. To give additional strength to the housing at this point I have provided a strengthening rib $B^4$ which passes around inside the housing. To the lower ends of this rib the spring bracket $c^4$ may be attached. In addition, the body is suspended from the axle of the front wheel in such a manner as to allow the position of the wheel to be altered for purposes of controlling the vehicle. For this purpose between each sleeve and the hub of the wheel there is a collar $g^5$ carrying an arm $g$ which is hinged by a knuckle bolt $g^2$ to a fork $g^1$ at one end of the arm $g^3$. A nut $g^6$ screwed onto the end of the axle clamps the sleeve and collar in place. The other end of the arm $g^3$ is suitably forked and connected by a bolt $g^4$ to the quadrant G which passes around the front of the wheel, the whole forming a steering and supporting frame for the front wheel. The quadrant G is mounted upon the body by trunnions $G^1$, upon which the steering frame is allowed to swing, subject to the tension of the springs $c^3$. I prefer to steer the machine by means of a steering wheel like that usual on automobiles, and for that purpose have shown a shaft H suitably hung inside the housing as by straps or bearings $h$. The steering wheel is lettered $H^1$ and is located at one end of the shaft H, the other end of said shaft carrying a bevel gear $H^2$.

In mesh with the bevel gear $H^2$ is a corresponding bevel gear J the axle of which is mounted in a bearing $j$ which hangs from the rib $B^4$. To this gear J is attached a steering arm $J^1$ which is connected by a gimbal or other like joint $j^1$ with a connecting rod $J^2$, the other end of which is connected by a ball-and-socket joint $j^2$ with the arm $J^3$ which is carried by one of the knuckles $g$.

By this means the turning of the steering wheel $H^1$ will cause the rotation of the bevel gear J and the movement of the steering arm $J^1$, thus altering the position of the road wheel C for purposes of steering to the right or left as the case may be. The wheel C, however, must be rocked or canted slightly as well as turned, in order that equilibrium may easily be maintained; and accordingly the two pairs of pivots lettered $g^2$ and $g^4$, instead of being in a vertical position, are set at an angle of about 25 degrees to the vertical, for the same reason that the front fork bearing of a bicycle or ordinary motor cycle is set at an angle to the vertical, i. e., in order that a suitable amount of rock or cant may be imparted to the wheel when it is turned. In fact, the motion described by the front wheel in my device is almost exactly the same as in a bicycle, albeit this result is attained in a different manner.

As a convenience to support the machine when at rest and to allow it to be easily started after the user is seated without falling sidewise, as well as to prevent skidding and to keep it vertical while it is being driven backward, I provide wheels K, each mounted like casters in bearings $K^1$ in which they may turn on a vertical axis, these bearings being carried on the end of a spring rod $K^2$ attached to a cross-shaft $k$ mounted in bearings on the sill. A spring $K^3$ connects each spring rod $K^2$ with the top of the housing and tends to hold it out of touch with the ground. The spring rods $K^2$ allow the drop wheels to yield to irregularities of the road. To the shaft $k$ is also attached an arm $k^1$ having at its outer end a pedal $k^2$ by which the device may be operated. A rack $k^3$ is located on the side of the sill and this arm $k^1$ may be locked therein as described. When the machine is to be brought to rest the arm $k^1$ and rack $k^3$ will be disengaged and the arm pushed forward against the force of the springs $K^3$ until the drop wheels run on the ground, when the arm can be locked in the rack $k^3$ and on the stopping of the machine its forward end will rest on these wheels K as well as the front wheel C.

I have referred above to the desirability of adjusting the relation between the rear end of the body and the axle $d$ by means of the lever $f$. The purpose of this is to adjust the floor of the machine at an angle to the horizontal. Thus when driving with great rapidity the under surface of the floor may act as a plane striking the air at a slight angle so that the air will tend to lift the machine somewhat into the air, thus taking some of the weight off of the wheels. The object of making adjustable the angle to the horizontal is for purposes of altering the amount of this lift, which varies greatly with different speeds, and which it is desirable to increase or diminish at will.

I do not mean to limit my invention to the exact form of construction shown, as my invention relates primarily to the suspension of the body from the axles, the adjustability of the body thereon so that the lifting power of the air may be availed of, the mounting of the front wheel so that it may be turned for steering purposes, and to the inclosed streamline form of the entire vehicle. My invention is shown embodied in a two-wheeled vehicle; certain of its features may be embodied equally well in a vehicle having more than two wheels. Other means than the drop wheel may be adopted for maintaining equilibrium at slow speed or at rest.

In using the term "body" I do not mean to limit myself to a sill carrying a floor and a housing but to such a frame as will support the seat or seats and the engine, etc.

What I claim as my invention is:—

1. A motor vehicle comprising a body and wheels, each wheel having an axle, a frame connected to each axle, said frame at one end being pivotally connected to said body and at the other end being yieldingly connected to said body.

2. A motor vehicle comprising a body and wheels having axles and means for suspending said body from said axles comprising two frames each pivotally connected at one end to said body to swing pivotally and each carrying an axle support.

3. A motor vehicle comprising a body and wheels having axles and means for suspending said body from said axles comprising two frames each pivotally connected at one end to said body, each carrying an axle support, and spring connections between each frame and said body.

4. In a motor vehicle, a body and means to support said body comprising a front wheel and a trailer, and means connecting each of said wheels and said body comprising a frame mounted to swing vertically with relation to said body, said frame carrying axle supports for its wheel and yielding means connecting the free end of said frame with said body.

5. In a motor vehicle, a body, a wheel mounted to support the front of said body and a trailer to support the rear of said body and means whereby the rear portion of the vehicle may be adjusted in height with relation to the axis of the rear wheel about the axis of the front wheel as a fulcrum.

6. In a motor vehicle, a body, a wheel mounted to support the front end of said body and a trailer to support the rear end of said body, a frame pivoted to the body at one end, said trailer being mounted in said frame, and means whereby the plane of the lower surface of the body may be adjusted to the horizontal comprising connections adapted to adjust the position of the free end of said frame with relation to said body and locking means to maintain said adjustment.

7. In a motor vehicle comprising a body, a front wheel and a trailer and means for suspending said body from said front wheel comprising arms each carrying at one end a support for said wheel and hinged members connected to the other end of said arms and pivotally connected to said body, in combination with springs connecting said body with said wheel support.

8. In a motor vehicle comprising a body, a front wheel and a trailer and means for suspending said body from said front wheel comprising arms each carrying at the end a support for said wheel and hinged members connected to said arms and pivotally connected to said body, in combination with a steering wheel and connections between said steering wheel and said front wheel whereby the direction of said front wheel may be changed with relation to said body and said vehicle may be steered.

9. In a motor vehicle comprising a body, a front wheel and a trailer, means for suspending said body from said front wheel comprising a flexible frame pivotally mounted on said body and means for changing the direction of said front wheel with relation to said body whereby said front wheel when turned to steer the vehicle will be adapted to cant as and for the purposes described.

10. In a motor vehicle, a frame comprising a front member having at each end a side member hinged thereto, an axle, a wheel mounted thereon, and connections between said axle and said side members in combination with a body and pivotal connections between said body and said side members.

11. In a motor vehicle, a frame comprising a front member having at each end a side member hinged thereto, an axle, a wheel mounted thereon and connections between said axle and said side members, said front member being longer than the distance apart of the connections between said side members and said axle, in combination with a body and pivotal connections between said body and said side members.

12. In a motor vehicle, a steering mechanism comprising, in combination, a flexible frame comprising a front member having at each end a side member hinged thereto, an axle, a wheel mounted thereon, and connections between said axle and said side members hinged to said side members, means for pivotally supporting said front member and means for changing the direction of said wheel.

PERCIVAL W. WHITE.

Witnesses:
GEORGE O. G. COALE,
M. E. FLAHERTY.